(12) United States Patent
Garten et al.

(10) Patent No.: US 12,594,903 B1
(45) Date of Patent: Apr. 7, 2026

(54) SEAT BELT ASSEMBLY FOR PERSONAL TRANSPORT VEHICLES

(71) Applicant: Textron Inc., Providence, RI (US)

(72) Inventors: Benjamin Garten, Martinez, GA (US);
Rosemary Durant, Augusta, GA (US);
Cary Steyer, Augusta, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 19/276,283

(22) Filed: Jul. 22, 2025

(51) Int. Cl.
B60R 22/18 (2006.01)

(52) U.S. Cl.
CPC .................................... B60R 22/18 (2013.01)

(58) Field of Classification Search
CPC . B60R 22/18; B60R 2022/1806; B60R 22/26;
B60R 22/22
See application file for complete search history.

(56) References Cited

U.S. PATENT DOCUMENTS

| | | | | |
|---|---|---|---|---|
| 6,533,320 | B1 * | 3/2003 | Langensiepen | ......... B60R 22/18 |
| | | | | 280/808 |
| 6,565,120 | B2 * | 5/2003 | Ganesan | ................. B60R 22/02 |
| | | | | 280/801.1 |
| 6,786,510 | B2 * | 9/2004 | Roychoudhury | ....... B60R 22/02 |
| | | | | 280/802 |
| 6,869,105 | B2 * | 3/2005 | Cheng | ..................... B60R 22/06 |
| | | | | 280/808 |
| 7,731,237 | B2 * | 6/2010 | Eusebi | .................... B60R 22/00 |
| | | | | 280/808 |

| | | | | |
|---|---|---|---|---|
| 8,550,500 | B2 | 10/2013 | Yamamoto et al. | |
| 8,556,324 | B1 | 10/2013 | Yamamoto et al. | |
| 8,651,525 | B2 | 2/2014 | Kaku et al. | |
| 8,876,162 | B2 | 11/2014 | Shinbori et al. | |
| 9,475,413 | B2 | 10/2016 | Hayashi et al. | |
| 9,499,124 | B2 | 11/2016 | Kawakatsu et al. | |
| 9,616,844 | B2 | 4/2017 | Karube et al. | |
| 9,776,481 | B2 | 10/2017 | Deckard et al. | |
| 9,815,432 | B2 | 11/2017 | Kuroda et al. | |
| 10,166,896 | B2 | 1/2019 | Karube et al. | |
| 10,202,099 | B2 | 2/2019 | Tsumiyama et al. | |
| 10,246,045 | B2 * | 4/2019 | Clyde | .................... B60N 2/012 |
| 10,246,153 | B2 | 4/2019 | Deckard et al. | |

(Continued)

OTHER PUBLICATIONS

10LOL. (Apr. 28, 2025). Install Golf Cart Seat Belts in Minutes for Club Car DS [Video]. YouTube. https://www.youtube.com/watch?v=pHUeyQlkIEo (Year: 2025).*

(Continued)

*Primary Examiner* — Paul N Dickson
*Assistant Examiner* — Tiffany L Webb
(74) *Attorney, Agent, or Firm* — Foley & Lardner LLP

(57) ABSTRACT

A personal transport vehicle includes a vehicle frame and a seat belt assembly. The seat belt assembly includes a rail coupled to the vehicle frame, a crossbar spaced from the rail, a first buckle coupled to the rail, a second buckle coupled to the crossbar, a first belt, and a second belt. The first belt has a first belt first end coupled to the crossbar and a first belt second end coupled to the rail. The first belt is configured to be removably coupled to the first buckle. The second belt has a second belt first end coupled to the crossbar and a second belt second end coupled to the crossbar. The second belt is configured to be removably coupled to the second buckle.

20 Claims, 11 Drawing Sheets

(56) References Cited

U.S. PATENT DOCUMENTS

| | | | |
|---|---|---|---|
| 10,308,115 B2 | 6/2019 | Kawakatsu et al. | |
| 10,377,267 B2 | 8/2019 | Hayashi et al. | |
| 10,604,031 B2 | 3/2020 | Beauchemin et al. | |
| 10,994,785 B2 | 5/2021 | Deckard et al. | |
| 11,273,791 B1 * | 3/2022 | Willm | B60R 22/30 |
| 11,273,881 B2 | 3/2022 | Deckard et al. | |
| 12,091,112 B2 | 9/2024 | Roytek et al. | |
| 2014/0217715 A1 | 8/2014 | Minami et al. | |
| 2024/0409170 A1 | 12/2024 | Roytek et al. | |
| 2025/0002088 A1 | 1/2025 | Liang | |
| 2025/0332968 A1 * | 10/2025 | Wei | B60N 2/36 |

OTHER PUBLICATIONS

RXV-4: E-Z-Go, ezgo.txtsv.com/personal/models/rxv-4. Accessed Jun. 26, 2025.

* cited by examiner

SEAT BELT ASSEMBLY FOR PERSONAL TRANSPORT VEHICLES

BACKGROUND

Personal transport vehicles are used to transport occupants and, in some cases, equipment between different areas. By way of example, a personal transport vehicle may transport an operator and one or more passengers from an origin to a destination. It may be desirable to improve the comfort of operators and/or passengers of the personal transport vehicle.

SUMMARY

One embodiment relates to a personal transport vehicle. The personal transport vehicle includes a vehicle frame and a seat belt assembly. The seat belt assembly includes a rail coupled to the vehicle frame, a crossbar spaced from the rail, a first buckle coupled to the rail, a second buckle coupled to the crossbar, a first belt, and a second belt. The first belt has a first belt first end coupled to the crossbar and a first belt second end coupled to the rail. The first belt is configured to be removably coupled to the first buckle. The second belt has a second belt first end coupled to the crossbar and a second belt second end coupled to the crossbar. The second belt is configured to be removably coupled to the second buckle.

Another embodiment relates to a vehicle. The vehicle includes a vehicle frame having a canopy strut, a vehicle body coupled to the vehicle frame, a first seat assembly coupled to the vehicle frame, a second seat assembly coupled to the vehicle frame, the second seat assembly having a seat body and a seat back, and a seat belt assembly. The seat belt assembly includes a rail coupled to the vehicle frame, a crossbar positioned between the first seat assembly and the second seat assembly, a first belt, and a second belt. The first belt has a first belt first end coupled to the crossbar, a first belt second end, opposite the first belt first end, coupled to the rail, and a first belt middle portion, between the first belt first end and the first belt second end, coupled to the canopy strut. The second belt has a second belt first end coupled to the crossbar, a second belt second end, opposite the second belt first end, coupled to the crossbar, and a second belt middle portion, between the second belt first end and the second belt second end, coupled to the canopy strut.

Still another embodiment relates to a seat belt assembly for a vehicle. The seat belt assembly includes a rail having a rail first end and a rail second end, opposite the rail first end, a crossbar configured to be spaced from the rail, the crossbar having a crossbar first lateral end and a crossbar second lateral end, opposite the crossbar first lateral end, a first buckle configured to couple to the rail between the rail first end and the rail second end, a second buckle configured to couple to the crossbar between the crossbar first lateral end and the crossbar second lateral end, a first belt, and a second belt. The first belt has a first belt first end configured to couple to the crossbar and a first belt second end configured to couple to the rail. The first belt is configured to be removably coupled to the first buckle. The second belt has a second belt first end configured to couple to the crossbar and a second belt second end configured to couple to the crossbar. The second belt is configured to be removably coupled to the second buckle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
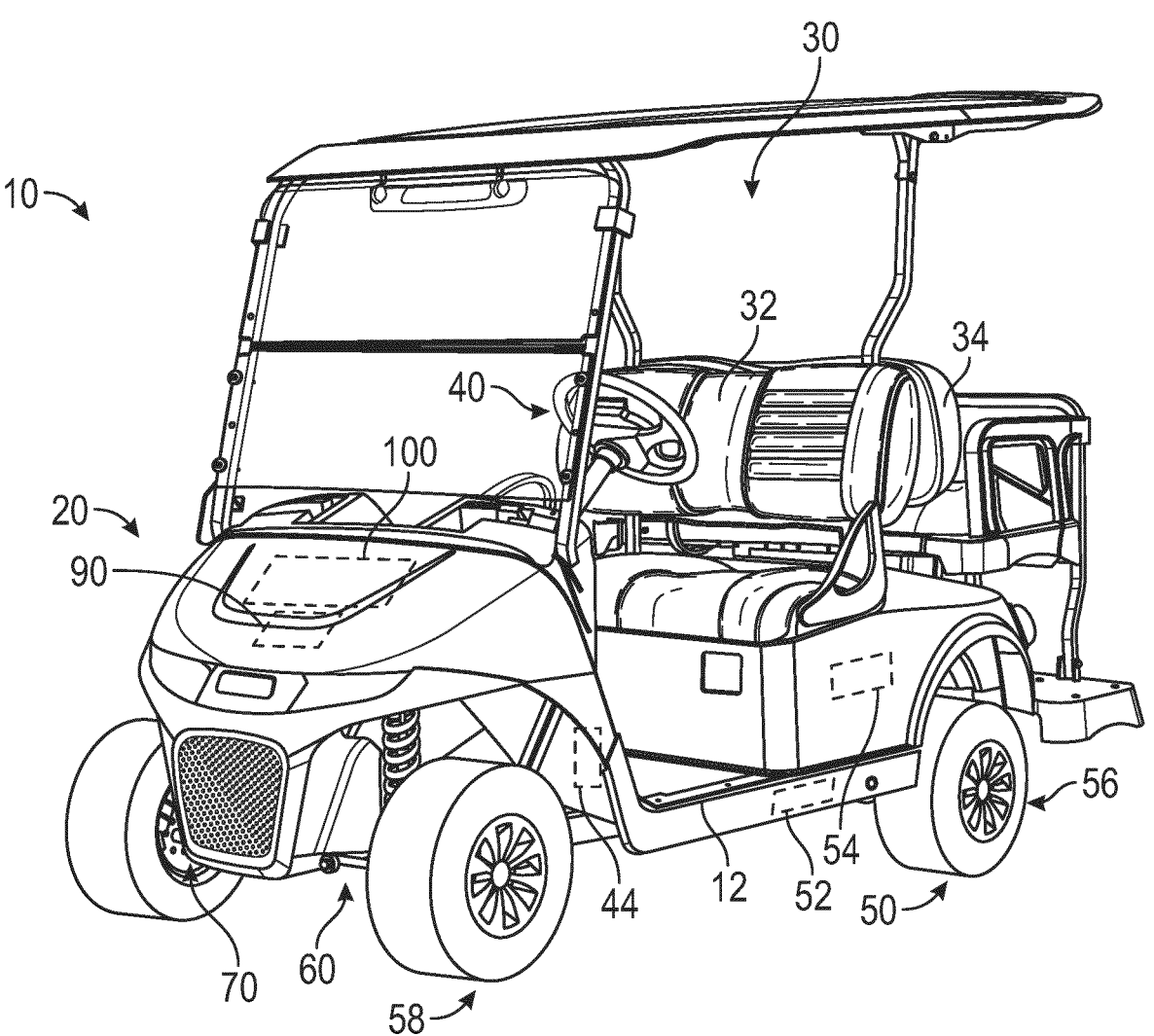
FIG. 1 is a perspective view of a vehicle, according to an exemplary embodiment.
Figure 2:
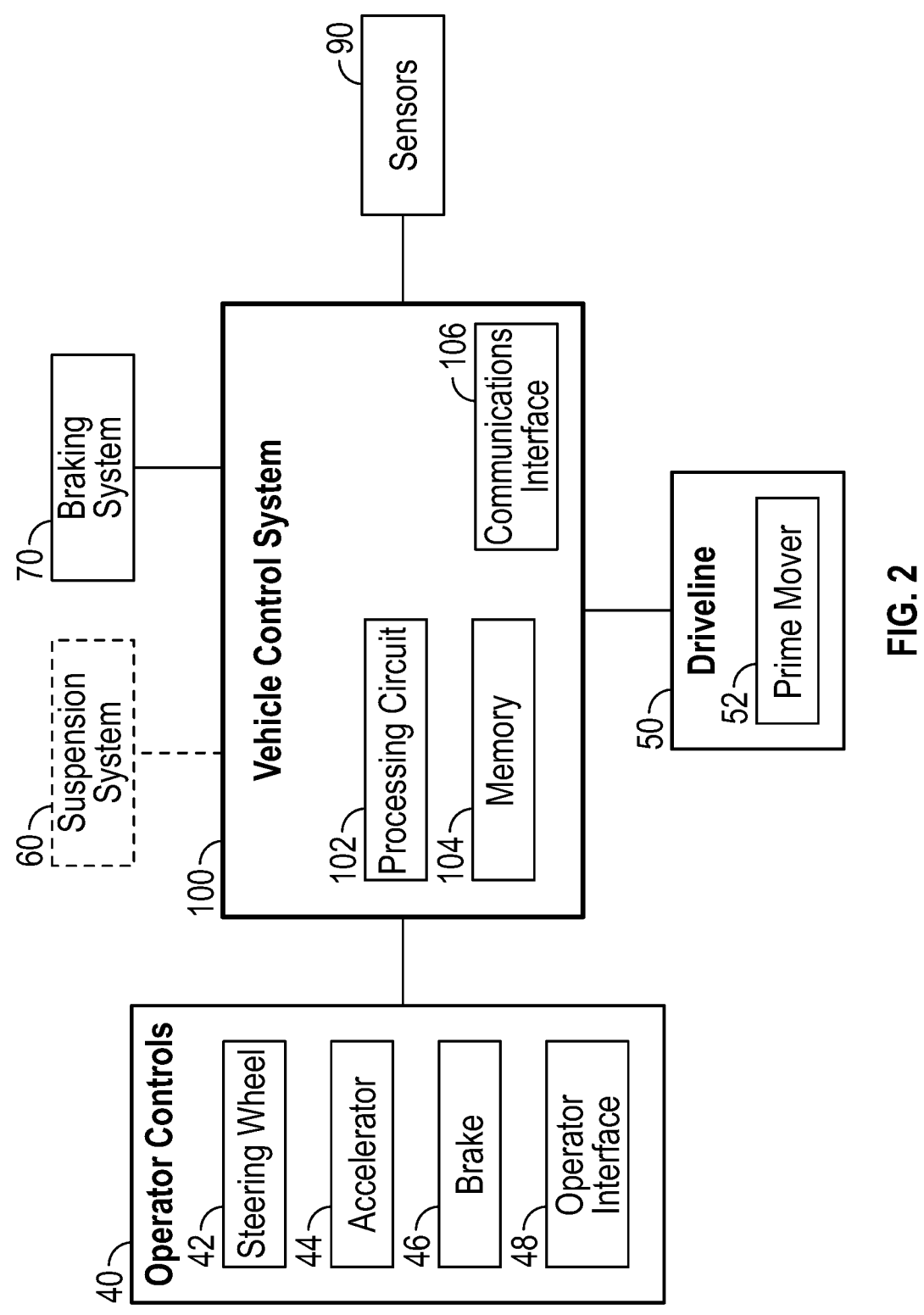
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart or vehicle, an all-terrain vehicle ("ATV"), a utility task vehicle ("UTV"), a low speed vehicle ("LSV"), a personal transport vehicle ("PTV"), a hauler, and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, another type of chore product that may be used on a golf course, a ground support equipment ("GSE") that may be used at an airport, and/or still other off-road machines or vehicles.

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing rearward. In some embodiments, the rear row seating 34 is facing forward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown as steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input devices may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor (e.g., the motor 53) and the energy storage 54 is a battery system (e.g., the battery module 57, the add-on battery module(s) 59, etc.). In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, electric regenerative braking is employed (e.g., via the prime mover 52, an electric motor, etc.) in combination with or instead of using the braking system 70 to facilitate braking of one or more components of the driveline 50.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, a Doppler sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Electrified Driveline

Figure 3:
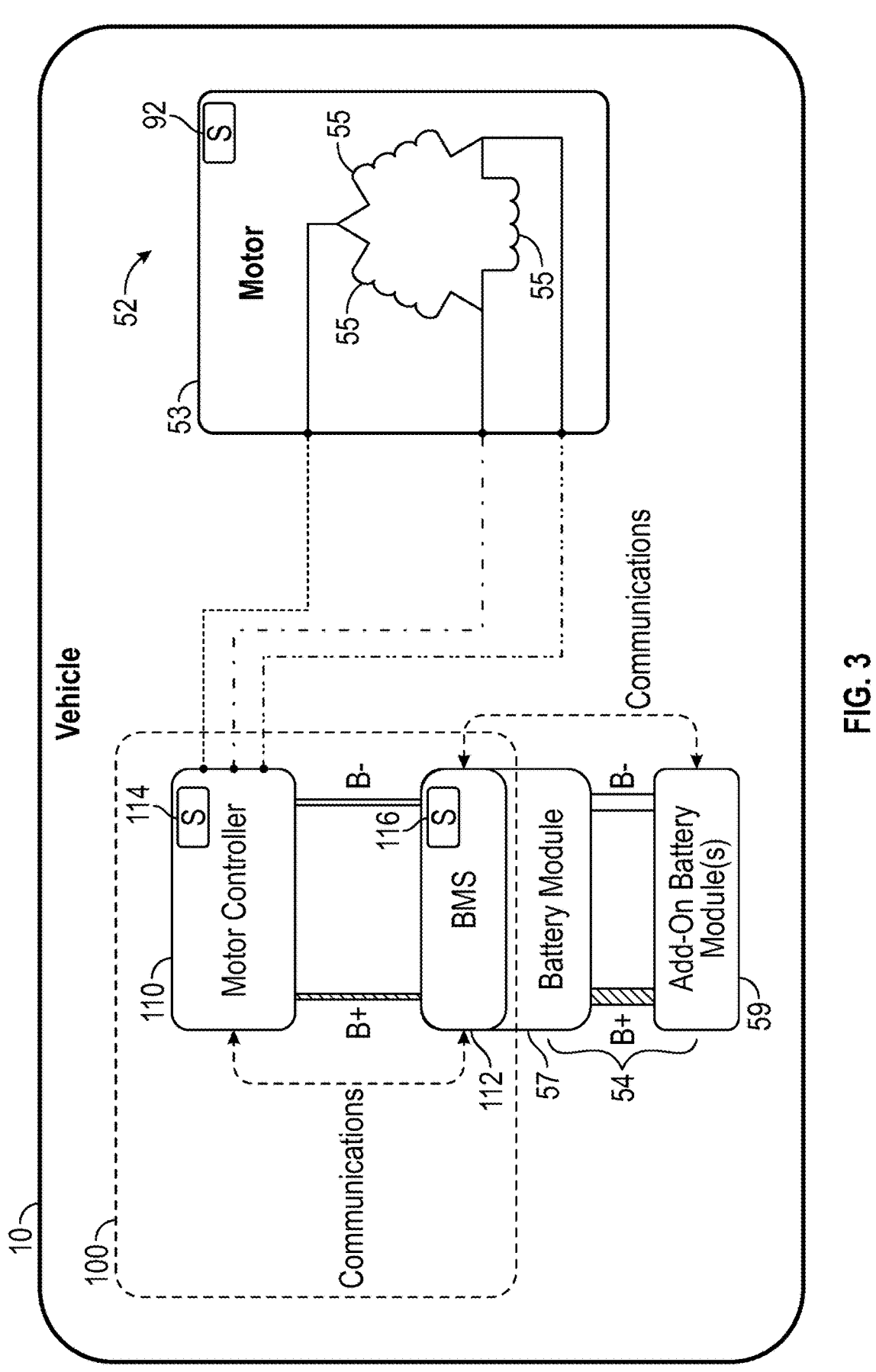
FIG. 3 is another schematic block diagram of the vehicle of FIG. 1, according to an exemplary embodiment.

According to the exemplary embodiments shown in FIG. 3, the driveline 50 of the vehicle 10 is configured as an electrified driveline where (a) the prime mover 52 is configured as a three-phase, alternating current ("AC") electric motor, shown as motor 53, including three sets of windings, shown as motor windings 55, and a first sensor, shown as motor sensor 92; (b) the energy storage 54 is configured as a battery system including a first battery pack or module, shown as battery module 57, and one or more second battery packs or modules, shown as add-on battery module(s) 59, electrically coupled to the battery module 57 in parallel; and (c) the vehicle control system 100 includes (i) a first controller, shown as motor controller 110, coupled to the motor 53 and including a second sensor, shown as motor controller sensor 114, and (ii) a second controller, shown as battery management system ("BMS") 112, coupled to the motor controller 110 and the energy storage 54 (e.g., the battery system, the battery module 57, the add-on battery module(s) 59, etc.) and including a third sensor, shown as BMS sensor 116. In some embodiments, the motor 53 is configured as a separately excited DC motor. The motor sensor 92, the motor controller sensor 114, and/or the BMS sensor 116 may include a temperature sensor, a voltage sensor, a current sensor, a speed sensor, and/or another suitable sensor to facilitate monitoring at least one of the operational parameters (e.g., temperature, voltage, current, speed, SOC, rate of charge, rate of discharge, etc.) of the motor 53, the motor controller 110, the BMS 112, the battery module 57, and/or the add-on battery modules(s) 59. The motor controller 110 and the BMS 112 may each include a processing circuit 102, a memory 104, and a communications interface 106.

According to an exemplary embodiment, each of the battery module 57 and the add-on battery module(s) 59 of the battery system includes one or more rows and/or groups of battery cells. The BMS 112 may be configured to monitor characteristics of the rows and/or groups of battery cells and/or individual cells of the battery module 57 and the add-on battery module(s) 59 (e.g., using data acquired by the BMS sensor 116) including, but not limited to, voltage, temperature, current, and state of charge ("SOC"). The BMS 112 may also be configured to provide direct current ("DC")

power from the battery system to the motor controller 110 to power the motor 53 based on driving demands of the vehicle 10.

According to an exemplary embodiment, the motor controller 110 is configured to manage the power supplied to the motor 53. By way of example, the motor controller 110 may be configured to modulate the voltage, current, phase, and/or frequency of the power sent to the motor windings 55, which can influence the torque and speed output provided by the motor 53. In some embodiments, the motor controller 110 is configured to control a type of power, AC power or DC power, delivered to the motor 53. By way of example, the motor controller 110 may be configured to convert the type of power from DC power to AC power and/or regulate the AC power or DC power depending on the intended function of the motor 53. The motor controller 110 may include components to invert, convert, or otherwise modulate DC power and/or AC power.

As shown in FIG. 3, the energy storage 54 is configured to supply (e.g., via electrical wiring, electrical connections, etc.) DC power to the motor controller 110. In some embodiments, the DC power flows from the energy storage 54, through the BMS 112, and to the motor controller 110. The BMS 112 and the motor controller 110 may include communication interfaces (e.g., communications interfaces 106) that facilitate exchanging data related to operational status, command signals, and feedback therebetween. The BMS 112 and the add-on battery module 59 (e.g., a BMS thereof) may include communication interfaces that facilitate exchanging data related to operational status, command signals, and feedback therebetween. The add-on battery module(s) 59 is(are) configured to provide additional battery cells and increase the total energy storage capacity of the energy storage 54. As shown in FIG. 3, the battery module 57 and the add-on battery module(s) 59 are connected in parallel (e.g., via wires, connection busses, etc.) to provide for a pathway of electrical transfer. In other embodiments, the battery module 57 and the add-on battery module(s) 59 are connected in series.

According to an exemplary embodiment, the BMS 112 is configured to monitor (e.g., continuously, periodically, etc.) various parameters of the energy storage 54, including voltage, current, and temperature of each cell, rows/groups, and/or module within the energy storage 54. In some embodiments, the BMS 112 is configured to calculate or otherwise determine the SOC of the energy storage 54, the battery module 57, and/or the add-on battery module(s) 59. In some embodiments, the BMS 112 is configured to redistribute charge among the cells, rows/groups, and/or the modules to ensure an equal or substantially equal charge level throughout the energy storage 54. The BMS 112 can communicate with other systems or components or the vehicle 10 or with external devices (e.g., one or more remote systems) to report on battery status and diagnostics and/or to receive control commands.

According to an exemplary embodiment, the BMS 112 is configured to detect faults or failures in the energy storage 54 that may potentially lead to or that have caused an overcharge condition and, thereby, a thermal runaway event. By way of example, the BMS 112 may be configured to monitor the voltage of individual cells, rows/groups, or modules of the energy storage 54, and when deviations from normal voltage levels occur beyond a nominal range, the BMS 112 may determine that a fault or failure is present and that there is a potential for an overcharge condition or that there is an actual overcharge condition. In some implementations, the BMS 112 is configured to detect voltage imbalance or voltage imbalance trends. By way of another example, the BMS 112 may additionally or alternatively be configured to monitor current flows during charging and discharging of the energy storage 54 and identify unexpected fluctuations in current that may indicate that a fault or failure is present and that there is a potential for an overcharge condition or that there is an actual overcharge condition. By way of still another example, the BMS 112 may additionally or alternatively be configured to monitor the temperature of the cells, rows/groups, and/or modules of the energy storage 54 and identify anomalously high temperatures that may indicate that a fault or failure is present and that there is a potential for an overcharge condition or that there is an actual overcharge condition. It should be understood that the above example of detecting faults, failures, or overcharge conditions is provided for example purposes only and is not exhaustive. Other methods or techniques may be implemented to detect faults, failures, or overcharge conditions, which are intended to be included within the scope of the present disclosure. Additional details regarding fault detection regarding the energy storage 54 is described in greater detail herein. Further details regarding fault detection, including voltage imbalance, may be found in U.S. patent application Ser. No. 18/884,363, filed Sep. 13, 2024, which is incorporated herein by reference in its entirety.

Seat Belt Assembly

Referring to FIGS. 4-11, the vehicle 10 (or portions thereof) is shown according to various exemplary embodiments. The vehicle 10 of FIGS. 4-11 may be substantially similar to the vehicle 10 of FIG. 1 except as otherwise specified herein. In some embodiments, the vehicle 10 is configured as a PTV.

Figure 7:
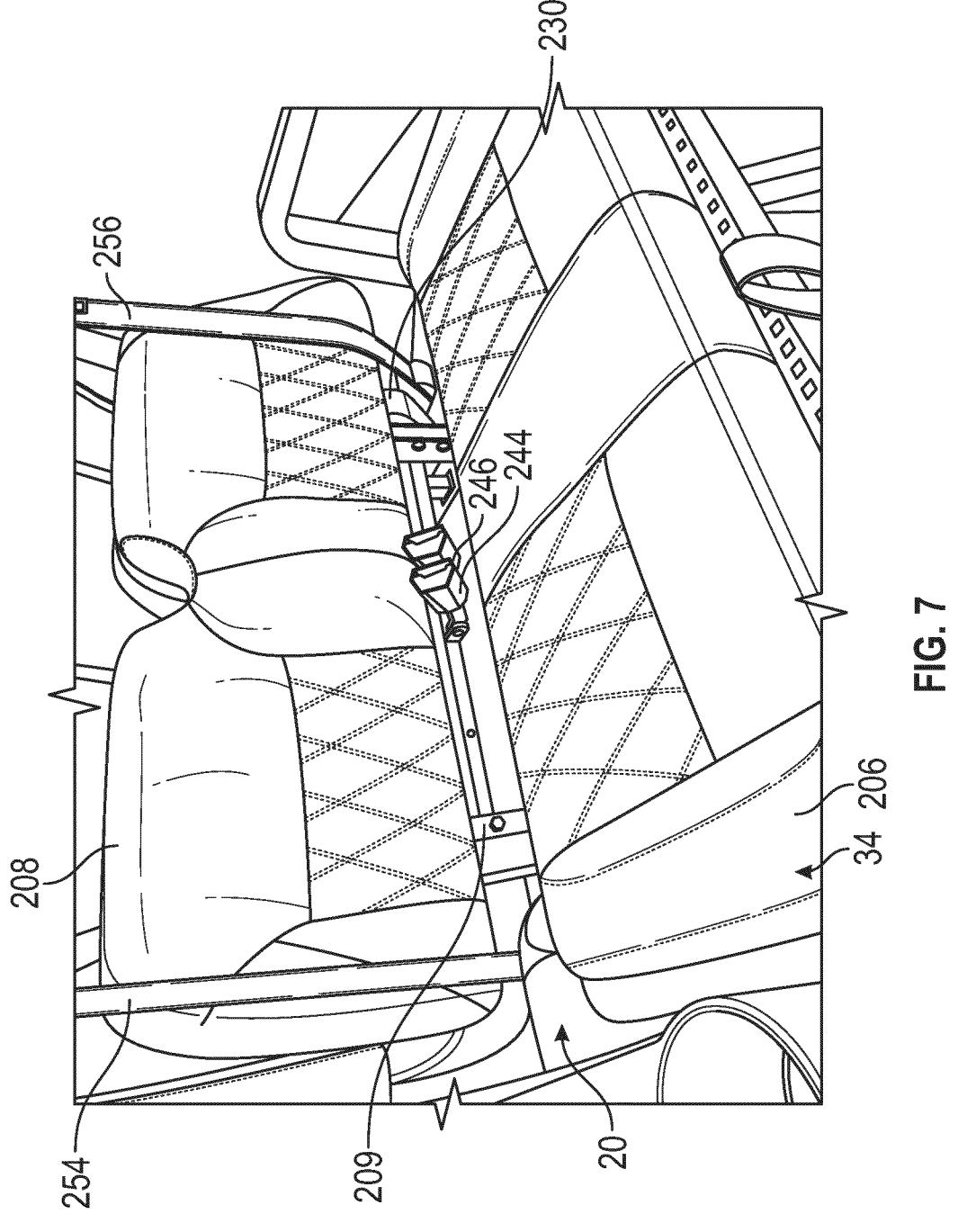
FIG. 7 is a rear perspective view showing a portion of the vehicle of FIG. 4 including the seat belt assembly, according to an exemplary embodiment.
Figure 8:
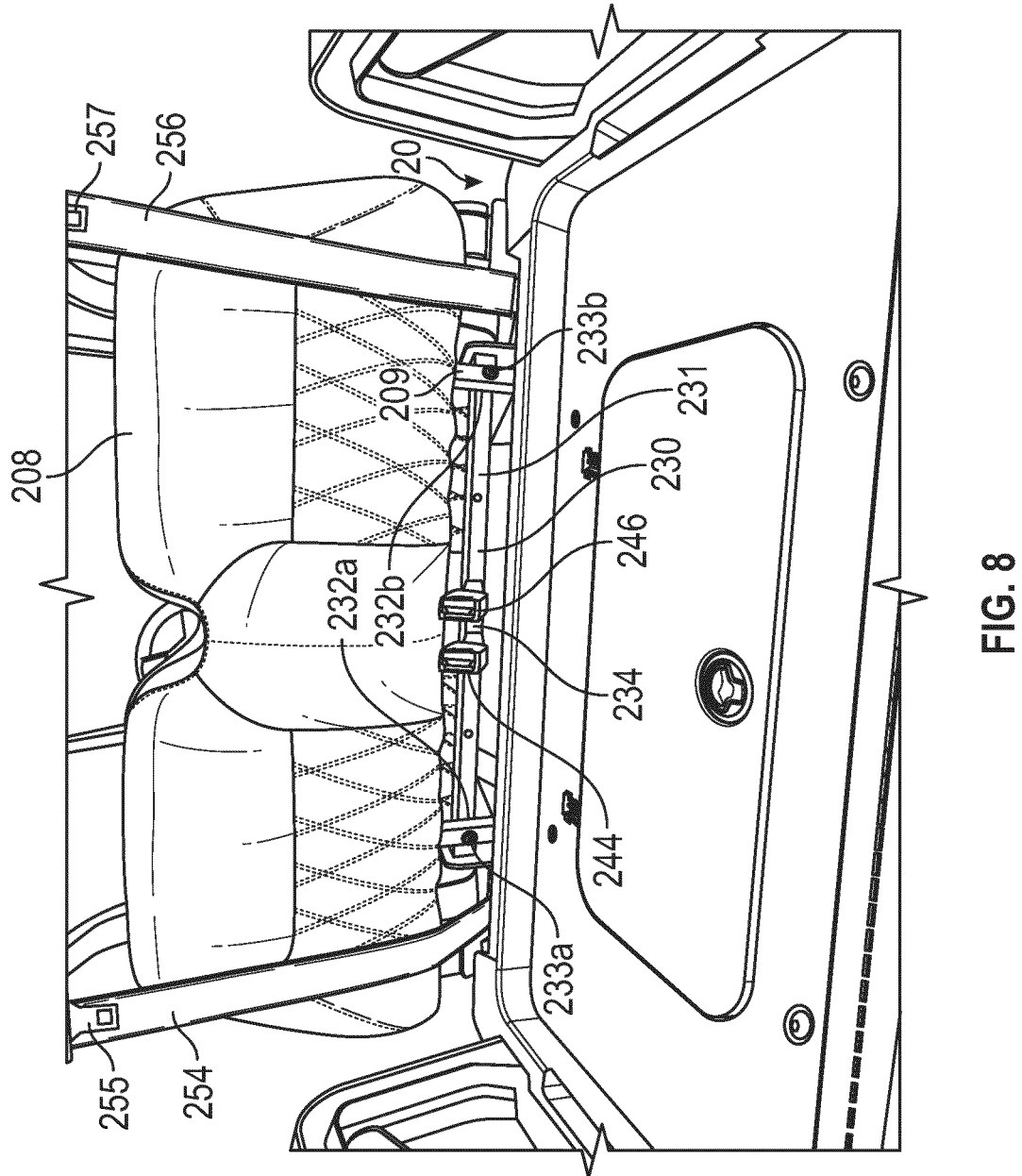
FIG. 8 is a rear perspective view showing a portion of the vehicle of FIG. 4 including the seat belt assembly without a rear seat body, according to an exemplary embodiment.
Figure 9:
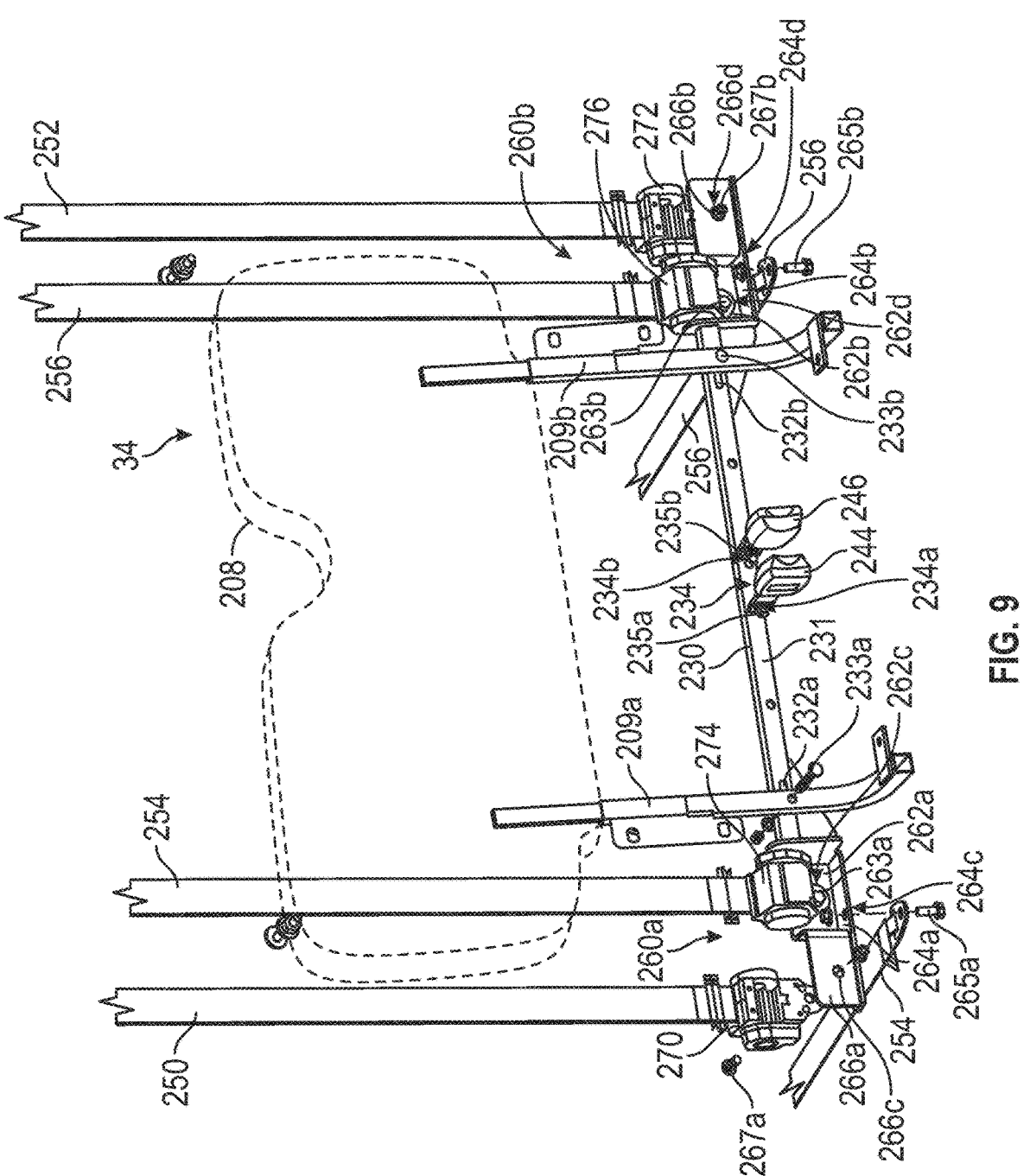
FIG. 9 is a rear perspective view showing a portion of the seat belt assembly of FIG. 4, according to an exemplary embodiment.

As shown in FIGS. 4-11, the vehicle 10 includes a passenger retention system, shown as seat belt assembly 200. The seat belt assembly 200 includes a first frame member, shown as a rail 210; a second frame member, shown as a crossbar 230; one or more forward-facing receiving members, shown as first forward-facing buckle 240 and second forward-facing buckle 242; one or more rear-facing receiving members, shown as first rear-facing buckle 244 and second rear-facing buckle 246; one or more forward-facing retention members, shown as first forward-facing belt 250 and second forward-facing belt 252; one or more rear-facing retention members, shown as first rear-facing belt 254 and second rear-facing belt 256. As shown in FIG. 9, the seat belt assembly 200 includes one or more belt retractors, shown as first forward-facing belt retractor 270, second forward-facing belt retractor 272, first rear-facing belt retractor 274, and second rear-facing belt retractor 276. In some embodiments, the seat belt assembly 200 includes more or fewer components.

Figure 4:
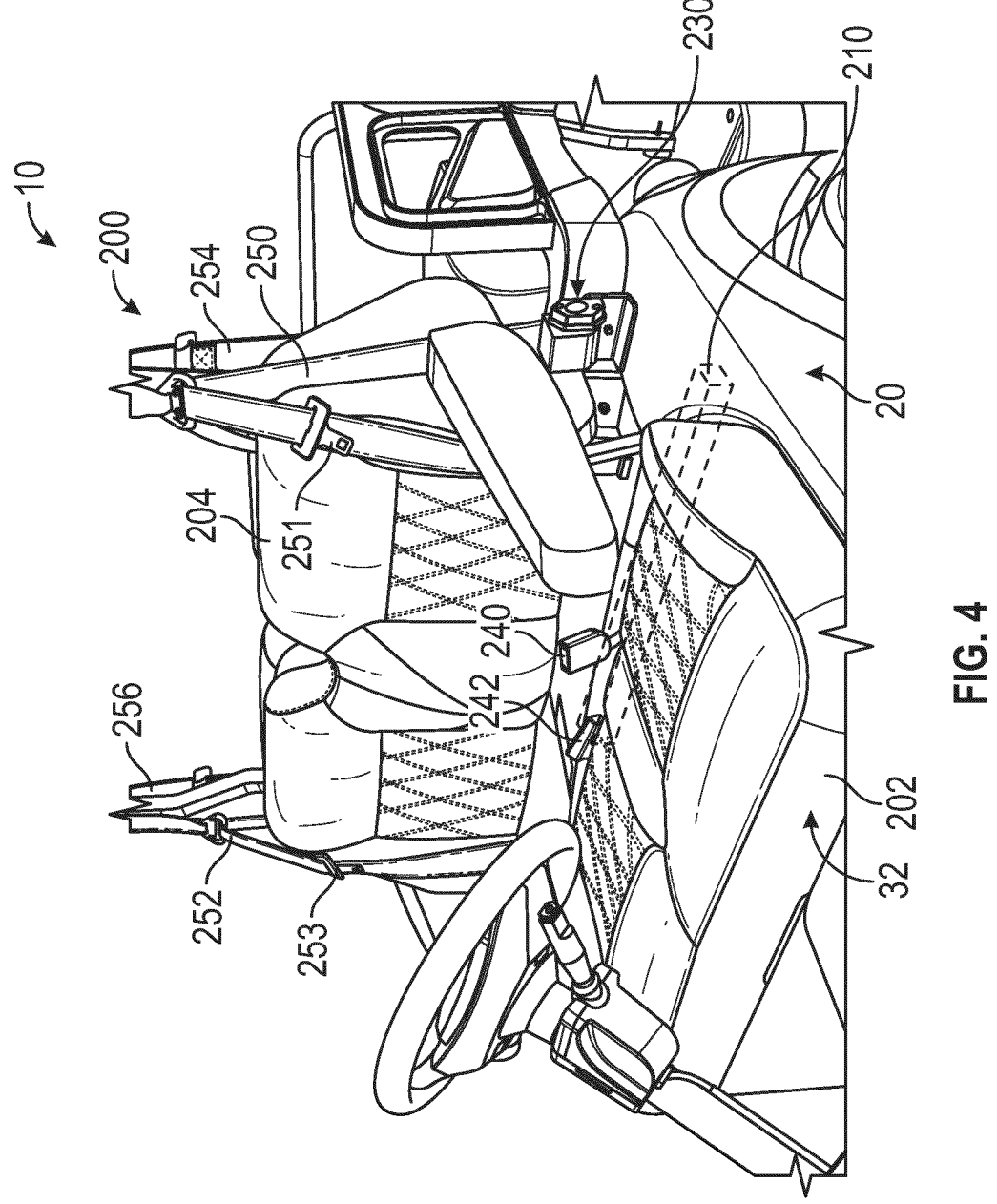
FIG. 4 is a front perspective view showing a portion of a vehicle including a seat belt assembly, according to an exemplary embodiment.

As shown in FIG. 4, the vehicle 10 includes the front row seating 32 (e.g., a front row seat assembly, a forward-facing seat assembly, first seat assembly, etc.) coupled to the frame 12. The front row seating 32 is facing forward. The front row seating 32 includes a first seat portion, shown as seat body 202 (e.g., a first seat body, a forward-facing seat body, a seat bottom, etc.), and a second seat portion (e.g., a seat back, a first backrest, forward-facing backrest, etc.), shown as backrest 204. The seat body 202 extends substantially horizontally and supports the bottom of an occupant (e.g., a driver, a passenger, etc.). The backrest 204 extends substantially vertically and supports the back of the occupant. The seat body 202 and the backrest 204 are coupled to the frame 12.

As shown in FIG. 4, the first forward-facing buckle 240, the second forward-facing buckle 242, the first forward-facing belt 250, and the second forward-facing belt 252 define a seat belt arrangement for the front row seating 32. By way of example, the first forward-facing buckle 240 and the first forward-facing belt 250 may define a first seat belt arrangement for a first seat of the front row seating 32 (e.g., a driver seat, an operator seat, etc.). By way of another example, the second forward-facing buckle 242 and the second forward-facing belt 252 may define a second seat belt arrangement for a second seat of the front row seating 32 (e.g., a passenger seat).

As shown in FIG. 7, the vehicle 10 includes the rear row seating 34 (e.g., a rear row seat assembly, a rear-facing seat assembly, second seat assembly, etc.) coupled to the frame 12. The rear row seating 34 is positioned longitudinally rearward of the front row seating 32. The rear row seating 34 is facing rearward. The rear row seating 34 includes a first seat portion, shown as seat body 206 (e.g., a second seat body, a rear-facing seat body, a seat bottom, etc.), a second seat portion (e.g., a seat back, a second backrest, rear-facing backrest, etc.), shown as backrest 208, and a seat support member, shown as seat frame 209. The seat body 206 extends substantially horizontally and supports the bottom of an occupant (e.g., a rear-facing passenger). The backrest 208 extends substantially vertically and supports the back of the occupant. The seat body 206 is coupled to the frame 12. The seat frame 209 is coupled to the frame 12. The backrest 208 is coupled to the seat frame 209, such that the seat frame 209 supports the backrest 208.

As shown in FIG. 7, the first rear-facing buckle 244, the second rear-facing buckle 246, the first rear-facing belt 254, and the second rear-facing belt 256 define a seat belt arrangement for the rear row seating 34. By way of example, the first rear-facing buckle 244 and the first rear-facing belt 254 may define a third seat belt arrangement for a first seat of the rear row seating 34 (e.g., a passenger seat). By way of another example, the second rear-facing buckle 246 and the second rear-facing belt 256 may define a fourth seat belt arrangement for a second seat of the rear row seating 34 (e.g., a passenger seat).

Figure 5:
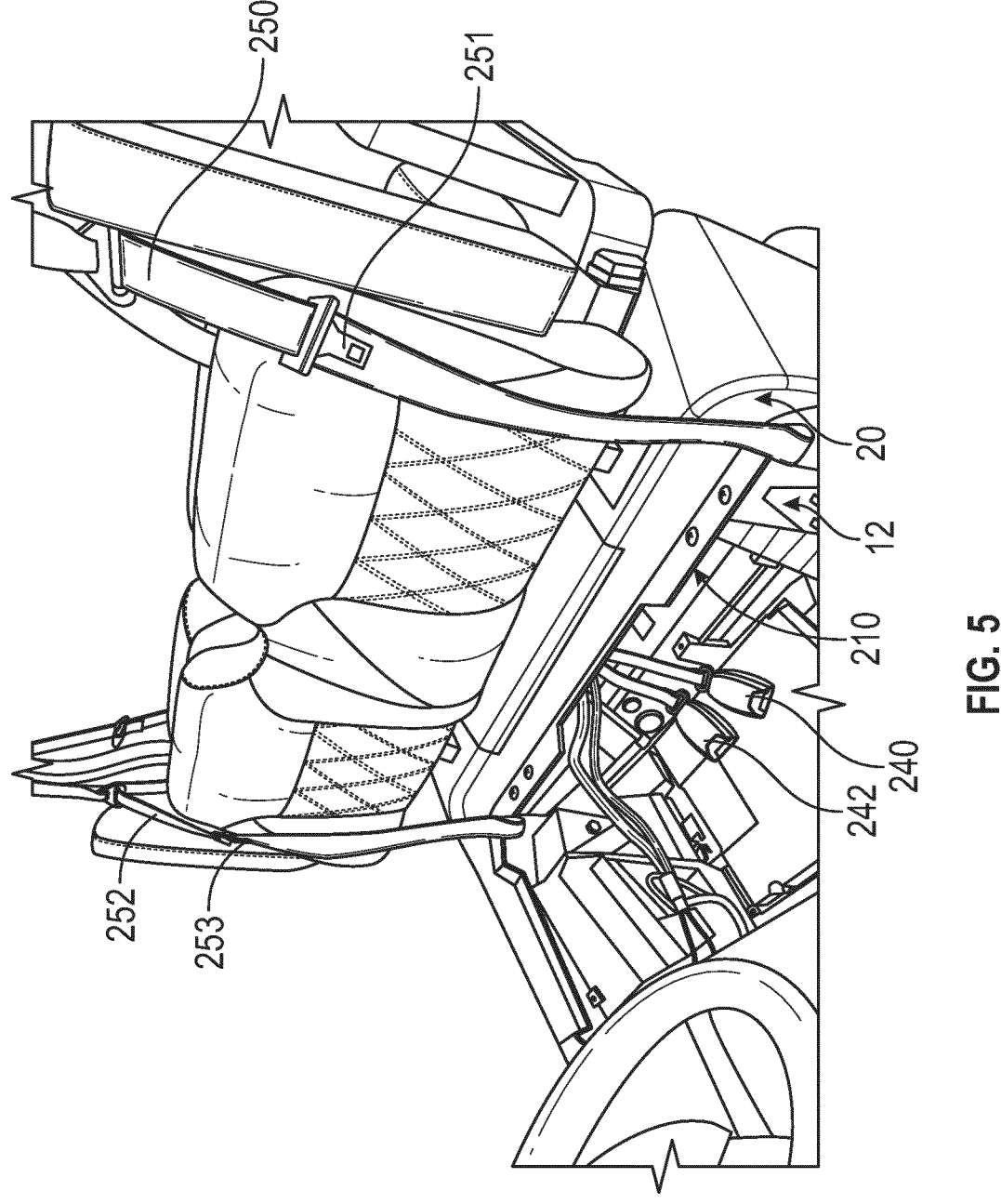
FIG. 5 is a front perspective view showing a portion of the vehicle of FIG. 4 including the seat belt assembly without a front seat body, according to an exemplary embodiment.
Figure 6:
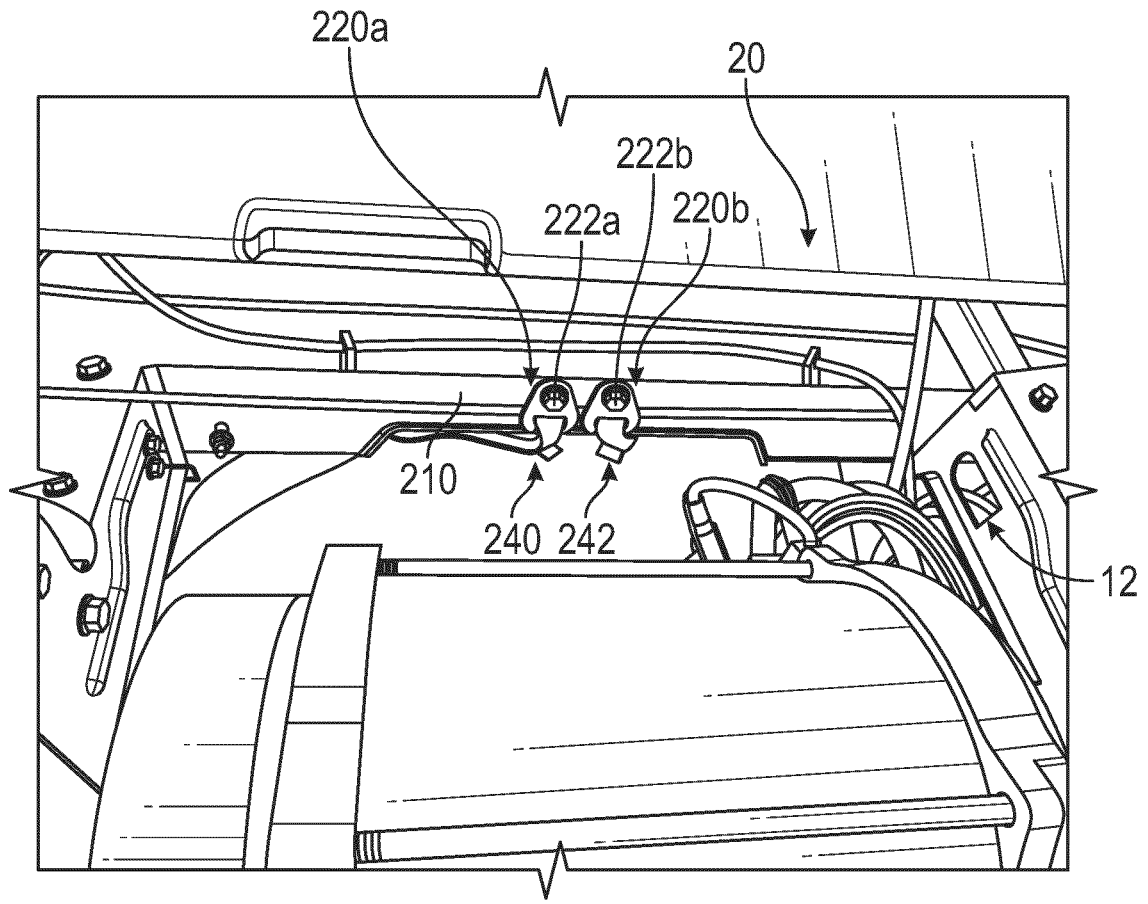
FIG. 6 is a bottom perspective view showing a portion of the vehicle of FIG. 4 including the seat belt assembly, according to an exemplary embodiment.
Figure 10:
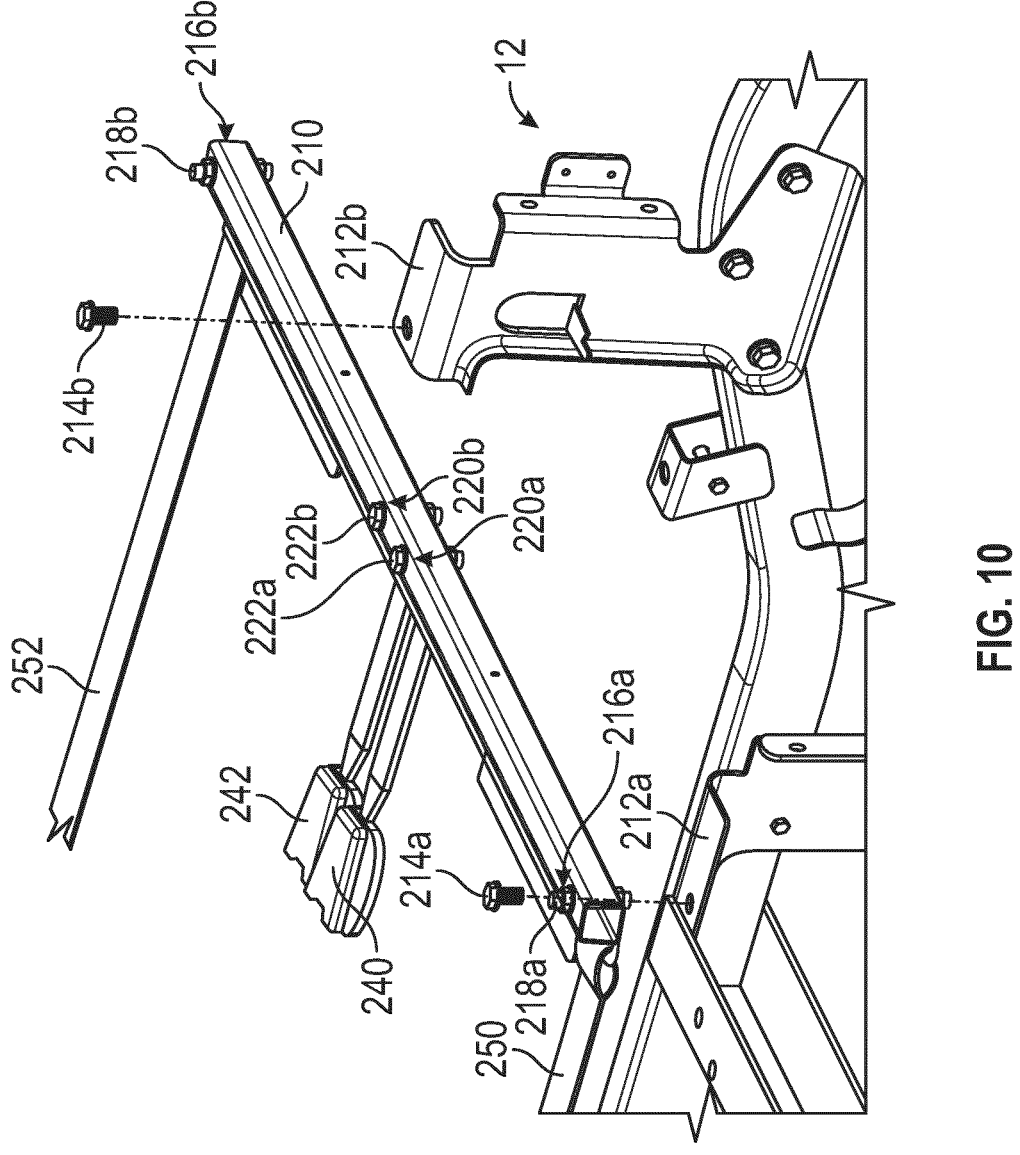
FIG. 10 is a rear perspective view showing another portion of the seat belt assembly of FIG. 4, according to an exemplary embodiment.

As shown in FIGS. 4-6 and 10, the rail 210 is coupled to the frame 12. As shown in FIGS. 4-6, the rail 210 is positioned vertically below the body 20. As shown in FIG. 10, the rail 210 has a rail first lateral end that is coupled to a first bracket 212a of the frame 12 by a first fastener 214a, and a rail second lateral end, opposite the rail first lateral end, that is coupled to a second bracket 212b of the frame 12 by a second fastener 214b.

As shown in FIG. 10, the rail 210 includes a first coupling portion (e.g., a receptacle, a coupling surface, etc.), shown as a first belt mount 216a, positioned proximate the rail first lateral end and a second coupling portion (e.g., a receptacle, a coupling surface, etc.), shown as a second belt mount 216b, positioned proximate the rail second lateral end. The first forward-facing belt 250 is coupled to the rail 210 at the first belt mount 216a by a first fastener 218a. The second forward-facing belt 252 is coupled to the rail 210 at the second belt mount 216b by a second fastener 218b.

As shown in FIGS. 6 and 10, the rail 210 includes a first buckle coupling portion (e.g., a receptacle, a coupling surface, etc.), shown as first buckle mount 220a and a second buckle coupling portion (e.g., a receptacle, a coupling surface, etc.), shown as second buckle mount 220b. The first buckle mount 220a and the second buckle mount 220b are positioned between the rail first lateral end and the rail second lateral end. By way of example, the first buckle mount 220a and the second buckle mount 220b may be positioned at or proximate a center of the rail 210. The first forward-facing buckle 240 is coupled to the rail 210 at the first buckle mount 220a by a first fastener 222a and the second forward-facing buckle 242 is coupled to the rail 210 at the second buckle mount 220b by a second fastener 222b.

As shown in FIGS. 6-8 and 11, the crossbar 230 is positioned at least partially vertically above the body 20 and between the front row seating 32 and the rear row seating 34. The crossbar 230 is spaced (e.g., vertically) from the rail 210. At least a portion of the body 20 is positioned between the crossbar 230 and the rail 210.

As shown in FIGS. 8 and 9, the crossbar 230 includes a central portion (e.g., a shaft portion, a main portion, etc.), shown as a crossbar body 231. The crossbar body 231 is a shaft that extends laterally across the body 20 of the vehicle 10.

As shown in FIGS. 8 and 9, the crossbar 230 is coupled to the rear row seating 34. More specifically, the crossbar 230 is coupled to a left-hand or driver-side frame member 209a of the seat frame 209 and a right-hand or passenger-side frame member 209b. The crossbar 230 includes a first seat coupling portion (e.g., a coupling surface, an aperture, a slot, etc.), shown as first seat mount 232a, and a second seat coupling portion (e.g., a coupling surface, an aperture, a slot, etc.), shown as second seat mount 232b. By way of example, the first seat mount 232a and the second seat mount 232b may be or include an aperture defined through the crossbar body 231. A first fastener 233a couples the crossbar 230 to the seat frame 209 at the first seat mount 232a and a second fastener 233b couples the crossbar 230 to the seat frame 209 at the second seat mount 232b.

As shown in FIGS. 8 and 9, the crossbar 230 includes a buckle coupling portion (e.g., a bracket, a coupling surface, etc.), shown as buckle mount 234. By way of example, the buckle mount 234 may be or include a bracket that is coupled to the crossbar body 231. The buckle mount 234 is positioned between a crossbar first lateral end of the crossbar 230 and a crossbar second lateral end of the crossbar 230. By way of example, the buckle mount 234 may be positioned at or proximate a center of the crossbar 230. The buckle mount 234 defines a first aperture 234a and a second aperture 234b. The first rear-facing buckle 244 and the second rear-facing buckle 246 are coupled to the crossbar 230 at the buckle mount 234. A first fastener 235a extends through the first aperture 234a and couples the first rear-facing buckle 244 to the buckle mount 234, and a second fastener 235b extends through the second aperture 234b and couples the second rear-facing buckle 246 to the buckle mount 234.

As shown in FIG. 9, the crossbar 230 includes a first side portion (e.g., a first bracket portion, a driver-side bracket portion, a first crossbar retractor bracket weldment), shown as first bracket portion 260a, positioned at the crossbar first lateral end of the crossbar 230 and a second side portion (e.g., a second bracket portion, a passenger-side bracket portion, a second crossbar retractor bracket weldment), shown as a second bracket portion 260b, positioned at the crossbar second lateral end of the crossbar 230, opposite the crossbar first lateral end. By way of example, the crossbar 230 may include the crossbar body 231, the first bracket portion 260a, and the second bracket portion 260b. By way of another example, the first bracket portion 260a and the second bracket portion 260b may be coupled to the crossbar body 231, such as at a first lateral end of the crossbar body 231 and a second lateral end of the crossbar body 231, opposite the first lateral end, respectively.

The first bracket portion 260a and the second bracket portion 260b are or include one or more features (e.g., apertures, brackets, etc.) for coupling the first forward-facing belt first forward-facing belt 250, the second forward-facing belt 252, the first rear-facing belt 254, and the second rear-facing belt 256 to the crossbar 230.

As shown in FIG. 9, the crossbar 230 includes a first rear-facing retractor coupling portion (e.g., a bracket, a vertical bracket, etc.), shown as first rear-facing retractor mount 262a, positioned proximate the crossbar first lateral end. The first rear-facing retractor mount 262a defines an aperture (e.g., an opening, a hole, etc.), shown as first rear-facing retractor mount aperture 262c. The first rear-facing belt retractor 274 is coupled to the crossbar 230 at the first rear-facing retractor mount 262a by a fastener 263a. By way of example, the fastener 263a extends through the first rear-facing retractor mount aperture 262c and couples the first rear-facing belt retractor 274 to the first rear-facing retractor mount 262a. The first rear-facing belt retractor 274 is coupled to a rear face of the first rear-facing retractor mount 262a. That is, the first rear-facing belt retractor 274 is positioned rearward of the first rear-facing retractor mount 262a.

As shown in FIG. 9, the crossbar 230 includes a first rear-facing belt coupling portion (e.g., a bracket, a horizontal bracket, etc.), shown as first rear-facing belt mount 264a, positioned proximate the crossbar first lateral end. The first rear-facing belt mount 264a defines an aperture (e.g., an opening, a hole, etc.), shown as first rear-facing belt mount aperture 264c. The first rear-facing belt mount aperture 264c is positioned laterally outward from the first rear-facing retractor mount aperture 262c. The first rear-facing belt 254 is coupled to the crossbar 230 at the first rear-facing belt mount 264a by a fastener 265a. By way of example, the fastener 265a extends through the first rear-facing belt mount aperture 264c and couples the first rear-facing belt 254 to the first rear-facing belt mount 264a. The first rear-facing belt 254 is coupled to a bottom face of the first rear-facing belt mount 264a. That is, the first rear-facing belt 254 is positioned vertically below the first rear-facing belt mount 264a.

As shown in FIG. 9, the crossbar 230 includes a first forward-facing retractor coupling portion (e.g., a bracket, a vertical bracket, etc.), shown as first forward-facing retractor mount 266a, positioned proximate the crossbar first lateral end. The first forward-facing retractor mount 266a defines an aperture (e.g., an opening, a hole, etc.), shown as first forward-facing retractor mount aperture 266c. The first forward-facing retractor mount aperture 266c is positioned laterally outward from the first rear-facing retractor mount aperture 262c and the first rear-facing belt mount aperture 264c. The first forward-facing belt retractor 270 is coupled to the crossbar 230 at the first forward-facing retractor mount 266a by a fastener 267a. By way of example, the fastener 267a extends through the first forward-facing retractor mount aperture 266c and couples first forward-facing belt retractor 270 to the first forward-facing retractor mount 266a. The first forward-facing belt retractor 270 is coupled to a front face of the first forward-facing retractor mount 266a. That is, the first forward-facing belt retractor 270 is positioned forward of the first forward-facing retractor mount 266a.

As shown in FIG. 9, the crossbar 230 includes a second rear-facing retractor coupling portion (e.g., a bracket, a vertical bracket, etc.), shown as second rear-facing retractor mount 262b, positioned proximate the crossbar second lateral end. The second rear-facing retractor mount 262b defines an aperture (e.g., an opening, a hole, etc.), shown as second rear-facing retractor mount aperture 262d. The second rear-facing belt retractor 276 is coupled to the crossbar 230 at the second rear-facing retractor mount 262b by a fastener 263b. By way of example, the fastener 263b extends through the second rear-facing retractor mount aperture 262d and couples second rear-facing belt retractor 276 to the second rear-facing retractor mount 262b. The second rear-facing belt retractor 276 is coupled to a rear face of the second rear-facing retractor mount 262b. That is, the second rear-facing belt retractor 276 is positioned rearward of the second rear-facing retractor mount 262b.

As shown in FIG. 9, the crossbar 230 includes a second rear-facing belt coupling portion (e.g., a bracket, a horizontal bracket, etc.), shown as second rear-facing belt mount 264b, positioned proximate the crossbar second lateral end. The second rear-facing belt mount 264b defines an aperture (e.g., an opening, a hole, etc.), shown as second rear-facing belt mount aperture 264d. The second rear-facing belt mount aperture 264d is positioned laterally outward from the second rear-facing retractor mount aperture 262d. The second rear-facing belt 256 is coupled to the crossbar 230 at the second rear-facing belt mount 264b by a fastener 265b. By way of example, the fastener 265b extends through the second rear-facing belt mount aperture 264d and couples the second rear-facing belt 256 to the second rear-facing belt mount 264b. The second rear-facing belt 256 is coupled to a bottom face of the second rear-facing belt mount 264b. That is, the second rear-facing belt 256 is positioned vertically below the second rear-facing belt mount 264b.

As shown in FIG. 9, the crossbar 230 includes a second forward-facing retractor coupling portion (e.g., a bracket, a vertical bracket, etc.), shown as second forward-facing retractor mount 266b, positioned proximate the crossbar second lateral end. The second forward-facing retractor mount 266b defines an aperture (e.g., an opening, a hole, etc.), shown as second forward-facing retractor mount aperture 266d. The second forward-facing retractor mount aperture 266d is positioned laterally outward from the second rear-facing retractor mount aperture 262d and the second rear-facing belt mount aperture 264d. The second forward-facing belt retractor 272 is coupled to the crossbar 230 at the second forward-facing retractor mount 266b by a fastener 267b. By way of example, the fastener 267b extends through the second forward-facing retractor mount aperture 266d and couples second forward-facing belt retractor 272 to the second forward-facing retractor mount 266b. The second forward-facing belt retractor 272 is coupled to a front face of the second forward-facing retractor mount 266b. That is, the first second forward-facing belt retractor 272 is positioned forward of the second forward-facing retractor mount 266b.

As shown in FIG. 9, the first bracket portion 260a includes the first rear-facing retractor mount 262a, the first rear-facing belt mount 264a, and the first forward-facing retractor mount 266a, and the second bracket portion 260b includes the second rear-facing retractor mount 262b, the second rear-facing belt mount 264b, and the second forward-facing retractor mount 266b.

In some embodiments, the first bracket portion 260a and the second bracket portion 260b are provided separate from the crossbar 230. By way of example, the first bracket portion 260a and the components/features thereof (e.g., the first rear-facing retractor mount 262a, the first rear-facing belt mount 264a, and the first forward-facing retractor mount 266a) may be provided separate from the crossbar 230. By way of another example, the second bracket portion 260b and the components/features thereof (e.g., the second rear-facing retractor mount 262b, the second rear-facing belt mount 264b, and the second forward-facing retractor mount 266b) may be provided separate from the crossbar 230. By way of still another example, the first bracket portion 260*a* and the second bracket portion 260*b* may be coupled to the crossbar 230, such as at a first lateral end of the crossbar body 231 and a second lateral end of the crossbar body 231, opposite the first lateral end, respectively. By way of yet another example, the first bracket portion 260*a* and the second bracket portion 260*b* may be coupled to one or more of the frame 12, the body 20, and/or another component of the vehicle 10 (e.g., other than the crossbar body 231).

Figure 11:
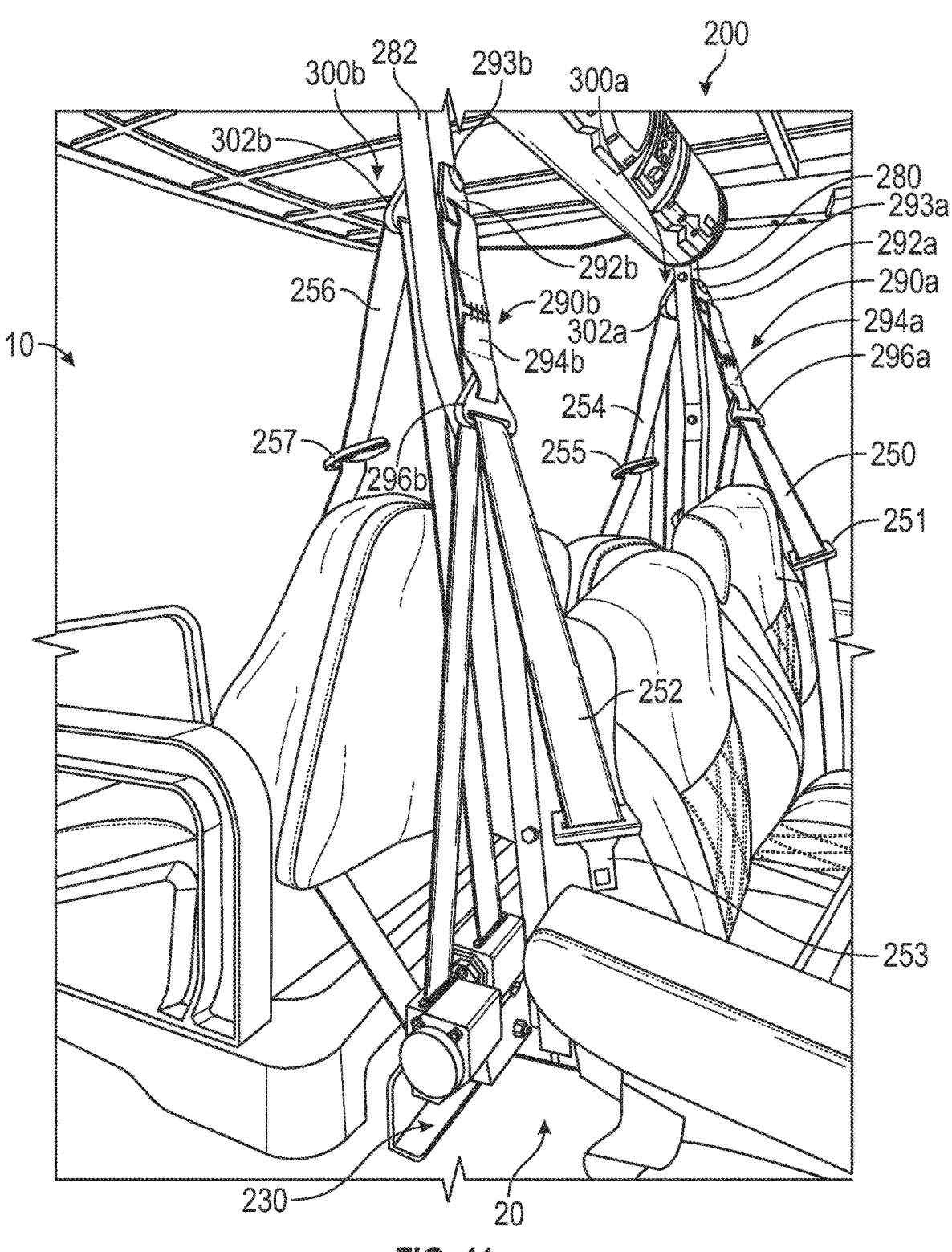
FIG. 11 is a side perspective view showing a portion of the vehicle of FIG. 4 including the seat belt assembly, according to an exemplary embodiment.

As shown in FIG. 11, the vehicle 10 includes roof or canopy support members, shown as first canopy strut 280 and second canopy strut 282. The first canopy strut 280 is positioned at or proximate a first lateral side of the vehicle 10. The second canopy strut 282 is positioned at or proximate a second lateral side of the vehicle 10, opposite the first lateral side. The first canopy strut 280 and the second canopy strut 282 are positioned between the front row seating 32 and the rear row seating 34. The first canopy strut 280 and the second canopy strut 282 are coupled to the frame 12 of the vehicle 10.

As shown in FIG. 11, the seat belt assembly 200 includes a belt retention member for each of the first forward-facing belt 250, the second forward-facing belt 252, the first rear-facing belt 254, and the second rear-facing belt 256, shown as first forward-facing harness 290*a*, second forward-facing harness 290*b*, first rear-facing harness 300*a*, and second rear-facing harness 300*b*, respectively.

The first forward-facing harness 290*a* couples the first forward-facing belt 250 to the first canopy strut 280. As shown in FIG. 11, the first forward-facing harness 290*a* includes a first coupling member, shown as first forward-facing bracket 292*a*; a connector, shown as first forward-facing strap 294*a*; and second coupling member, shown as first forward-facing belt loop 296*a*. The first forward-facing bracket 292*a* is spaced from the crossbar 230 in the vertical direction. The first forward-facing bracket 292*a* is coupled to the first canopy strut 280 by a fastener 293*a*. A first end of the first forward-facing strap 294*a* is coupled to the first forward-facing bracket 292*a* and a second end of the first forward-facing strap 294*a*, opposite the first end, is coupled to the first forward-facing belt loop 296*a*. The first forward-facing belt loop 296*a* defines an aperture or slot that is configured to receive a portion of the first forward-facing belt 250 therein. The aperture is sized such that the first forward-facing belt 250 is repositionable relative to the first forward-facing belt loop 296*a*. By way of example, the first forward-facing belt 250 may slide through the aperture of the first forward-facing belt loop 296*a*. In this way, the first forward-facing belt 250 is coupled to the first canopy strut 280 (e.g., via the first forward-facing harness 290*a* and/or the fastener 293*a*). In particular, a middle portion of the first forward-facing belt 250, between the first end and the second end, is coupled to the first canopy strut 280.

The second forward-facing harness 290*b* couples the second forward-facing belt 252 to the second canopy strut 282. As shown in FIG. 11, the second forward-facing harness 290*b* includes a first coupling member, shown as second forward-facing bracket 292*b*; a connector, shown as second forward-facing strap 294*b*; and a second coupling member, shown as second forward-facing belt loop 296*b*. The second forward-facing bracket 292*b* is spaced from the crossbar 230 in the vertical direction. The second forward-facing bracket 292*b* is coupled to the second canopy strut 282 by a fastener 293*b*. A first end of the second forward-facing strap 294*b* is coupled to the second forward-facing bracket 292*b* and a second end of the second forward-facing strap 294*b*, opposite the first end, is coupled to the second forward-facing belt loop 296*b*. The second forward-facing belt loop 296*b* defines an aperture or slot that is configured to receive a portion of the second forward-facing belt 252 therein. The aperture is sized such that the second forward-facing belt 252 is repositionable relative to the second forward-facing belt loop 296*b*. By way of example, the second forward-facing belt 252 may slide through the aperture of the second forward-facing belt loop 296*b*. In this way, the second forward-facing belt 252 is coupled to the second canopy strut 282 (e.g., via the second forward-facing harness 290*b* and/or the fastener 293*b*). In particular, a middle portion of the second forward-facing belt 252, between the first end and the second end, is coupled to the second canopy strut 282.

The first rear-facing harness 300*a* couples the first rear-facing belt 254 to the first canopy strut 280. As shown in FIG. 11, the first rear-facing harness 300*a* includes a first coupling member, shown as first rear-facing belt loop 302*a*. The first rear-facing belt loop 302*a* is spaced from the crossbar 230 in the vertical direction. The first rear-facing belt loop 302*a* is coupled to the first canopy strut 280 by the fastener 293*a*. The first rear-facing belt loop 302*a* defines an aperture or slot that is configured to receive a portion of the first rear-facing belt 254 therein. The aperture is sized such that the first rear-facing belt 254 is repositionable relative to the first rear-facing belt loop 302*a*. By way of example, the first rear-facing belt 254 may slide through the aperture of the first rear-facing belt loop 302*a*. In this way, the first rear-facing belt 254 is coupled to the first canopy strut 280 (e.g., via the first rear-facing harness 300*a* and/or the fastener 293*a*). In particular, a middle portion of the first rear-facing belt 254, between the first end and the second end, is coupled to the first canopy strut 280.

The second rear-facing harness 300*b* couples the second rear-facing belt 256 to the second canopy strut 282. As shown in FIG. 11, the second rear-facing harness 300*b* includes a second coupling member, shown as second rear-facing belt loop 302*b*. The second rear-facing belt loop 302*b* is spaced from the crossbar 230 in the vertical direction. The second rear-facing belt loop 302*b* is coupled to the second canopy strut 282 by the fastener 293*b*. The second rear-facing belt loop 302*b* defines an aperture or slot that is configured to receive a portion of the second rear-facing belt 256 therein. The aperture is sized such that the second rear-facing belt 256 is repositionable relative to the second rear-facing belt loop 302*b*. By way of example, the second rear-facing belt 256 may slide through the aperture of the second rear-facing belt loop 302*b*. In this way, the second rear-facing belt 256 is coupled to the second canopy strut 282 (e.g., via the second rear-facing harness 300*b* and/or the fastener 293*b*). In particular, a middle portion of the second rear-facing belt 256, between the first end and the second end, is coupled to the second canopy strut 282.

As shown in FIGS. 4-6B and 10, the first forward-facing buckle 240 and the second forward-facing buckle 242 are coupled to the rail 210 between the rail first lateral end and the rail second lateral end (e.g., at or proximate the center of the rail 210). As shown in FIG. 4, the first forward-facing buckle 240 and the second forward-facing buckle 242 extend through a gap defined between the seat body 202 of the front row seating 32 and the body 20.

As shown in FIGS. 7-9, the first rear-facing buckle 244 and the second rear-facing buckle 246 are coupled to the crossbar 230. The first rear-facing buckle 244 and the second rear-facing buckle 246 are coupled to the crossbar 230 between the crossbar first lateral end and the crossbar second lateral (e.g., at or proximate the center of the crossbar 230).

As shown in FIG. 7, the first rear-facing buckle 244 and the second rear-facing buckle 246 extend through a gap defined between the seat body 206 of the rear row seating 34 and the backrest 208 of the rear row seating 34.

As shown in FIG. 9, a first end of the first forward-facing belt 250 (e.g., a first belt first end) is coupled to the crossbar 230 at or proximate the crossbar first lateral end. In particular, the first end of the first forward-facing belt 250 is coupled to the first forward-facing belt retractor 270. The first forward-facing belt retractor 270 is configured to automatically retract the first forward-facing belt 250 and allow the first forward-facing belt 250 to be deployed when the first forward-facing belt 250 is pulled (e.g., by an occupant). The first forward-facing belt retractor 270 is also configured to retain or substantially prevent the movement of the first forward-facing belt 250 in response to a sudden or high force pull (e.g., a pull that has a force or pressure above a predetermined threshold over a predetermined period). As shown in FIG. 10, a second end of the first forward-facing belt 250 (e.g., a first belt second end) is coupled to the rail 210 at or proximate the rail first lateral end.

The first forward-facing belt 250 is configured to be removably coupled to the first forward-facing buckle 240. In particular, as shown in FIGS. 4 and 5, the first forward-facing belt 250 includes a first forward-facing belt tongue 251. The first forward-facing buckle 240 is configured to removably receive first forward-facing belt tongue 251.

As shown in FIG. 9, a first end of the second forward-facing belt 252 is coupled to the crossbar 230 at or proximate the crossbar second lateral end. In particular, the first end of the second forward-facing belt 252 is coupled to the second forward-facing belt retractor 272. The second forward-facing belt retractor 272 is configured to automatically retract the second forward-facing belt 252 and allow the second forward-facing belt 252 to be deployed when the second forward-facing belt 252 is pulled (e.g., by an occupant). The second forward-facing belt retractor 272 is also configured to retain or substantially prevent the movement of the second forward-facing belt 252 in response to a sudden or high force pull. As shown in FIG. 10, a second end of the second forward-facing belt 252 is coupled to the rail 210 at or proximate the rail second lateral end.

The second forward-facing belt 252 is configured to be removably coupled to the second forward-facing buckle 242. In particular, as shown in FIGS. 4 and 5, the second forward-facing belt 252 includes a second forward-facing belt tongue 253. The second forward-facing buckle 242 is configured to removably receive second forward-facing belt tongue 253.

As shown in FIG. 9, a first end of the first rear-facing belt 254 (e.g., a second belt first end) is coupled to the crossbar 230 at or proximate the crossbar first lateral end. In particular, the first end of the first rear-facing belt 254 is coupled to the first rear-facing belt retractor 274. The first rear-facing belt retractor 274 is configured to automatically retract the first rear-facing belt 254 and allow the first rear-facing belt 254 to be deployed when the first rear-facing belt 254 is pulled (e.g., by an occupant). The first rear-facing belt retractor 274 is also configured to retain or substantially prevent the movement of the first rear-facing belt 254 in response to a sudden or high force pull (e.g., a pull that has a force or pressure above a predetermined threshold over a predetermined period). As shown in FIG. 9, a second end of the first rear-facing belt 254 (e.g., a second belt second end) is coupled to the crossbar 230 at or proximate the crossbar first lateral end.

The first rear-facing belt 254 is configured to be removably coupled to the first rear-facing buckle 244. In particular, as shown in FIG. 8, the first rear-facing belt 254 includes a first rear-facing belt tongue 255. The first rear-facing buckle 244 is configured to removably receive first rear-facing belt tongue 255.

As shown in FIG. 9, a first end of the second rear-facing belt 256 is coupled to the crossbar 230 at or proximate the crossbar second lateral end. In particular, the first end of the second rear-facing belt 256 is coupled to the second rear-facing belt retractor 276. The second rear-facing belt retractor 276 is configured to automatically retract the second rear-facing belt 256 and allow the second rear-facing belt 256 to be deployed when the second rear-facing belt 256 is pulled (e.g., by an occupant). The second rear-facing belt retractor 276 is also configured to retain or substantially prevent the movement of the second rear-facing belt 256 in response to a sudden or high force pull. As shown in FIG. 9, a second end of the second rear-facing belt 256 is coupled to the crossbar 230 at or proximate the crossbar second lateral end.

The second rear-facing belt 256 is configured to be removably coupled to the second rear-facing buckle 246. In particular, as shown in FIG. 8, the second rear-facing belt 256 includes a second rear-facing belt tongue 257. The second rear-facing buckle 246 is configured to removably receive second rear-facing belt tongue 257.

As utilized herein with respect to numerical ranges, the terms "approximately," "about," "substantially," and similar terms generally mean+/–10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, and the vehicle control system 100, the seatbelt assembly 200, etc.) as shown in the various exemplary embodiments is illustrative only. Additionally, any element disclosed in one embodiment may be incorporated or utilized with any other embodiment disclosed herein.

The invention claimed is:

1. A personal transport vehicle comprising:
a vehicle frame; and
a seat belt assembly including:
    a rail coupled to the vehicle frame;
    a crossbar spaced from the rail;
    a first buckle coupled to the rail;
    a second buckle coupled to the crossbar;
    a first belt having a first belt first end coupled to the crossbar and a first belt second end coupled to the rail, the first belt configured to be removably coupled to the first buckle; and
    a second belt having a second belt first end coupled to the crossbar and a second belt second end coupled to the crossbar, the second belt configured to be removably coupled to the second buckle.

2. The personal transport vehicle of claim 1, further comprising a vehicle body coupled to the vehicle frame, wherein the crossbar is positioned at least partially vertically above the vehicle body.

3. The personal transport vehicle of claim 1, further comprising a vehicle body coupled to the vehicle frame, wherein the rail is positioned vertically below the vehicle body.

4. The personal transport vehicle of claim 1, further comprising:
a first seat assembly coupled to the vehicle frame; and
a second seat assembly coupled to the vehicle frame, the second seat assembly positioned longitudinally rearward of the first seat assembly, wherein the crossbar is positioned between the first seat assembly and the second seat assembly.

5. The personal transport vehicle of claim 4, wherein the crossbar is coupled to the second seat assembly.

6. The personal transport vehicle of claim 4, wherein:
the first seat assembly is a forward-facing seat assembly;
the second seat assembly is a rear-facing seat assembly;
the vehicle frame includes a canopy strut positioned between the first seat assembly and the second seat assembly;

the first belt is coupled to the canopy strut; and the second belt is coupled to the canopy strut.

7. The personal transport vehicle of claim 6, wherein:

the first belt is coupled to the canopy strut by a fastener; and the second belt is coupled to the canopy strut by the fastener.

8. The personal transport vehicle of claim 1, wherein the first belt second end is coupled to the rail at or proximate a first lateral end of the rail.

9. The personal transport vehicle of claim 8, wherein the first buckle is coupled to the rail between the first lateral end of the rail and an opposing second lateral end of the rail.

10. The personal transport vehicle of claim 1, wherein the second belt first end is coupled to or proximate a first lateral end of the crossbar and the second belt second end is coupled to or proximate the first lateral end of the crossbar.

11. The personal transport vehicle of claim 10, wherein the second buckle is coupled to the crossbar between the first lateral end of the crossbar and an opposing second lateral end of the crossbar.

12. The personal transport vehicle of claim 1, wherein:

the first belt first end is coupled to the crossbar via a first retractor assembly; and the second belt first end is coupled to the crossbar via a second retractor assembly.

13. The personal transport vehicle of claim 1, wherein:

the first belt includes a first belt middle portion, between the first belt first end and the first belt second end, coupled to a canopy strut positioned between a first seat assembly and a second seat assembly; and the second belt includes a second belt middle portion, between the second belt first end and the second belt second end, coupled to the canopy strut.

14. A vehicle comprising:

a vehicle frame having a canopy strut;

a vehicle body coupled to the vehicle frame;

a first seat assembly coupled to the vehicle frame;

a second seat assembly coupled to the vehicle frame, the second seat assembly having a seat body and a seat back; and a seat belt assembly including:

a rail coupled to the vehicle frame;

a crossbar positioned between the first seat assembly and the second seat assembly;

a first belt having:

a first belt first end coupled to the crossbar;

a first belt second end, opposite the first belt first end, coupled to the rail; and a first belt middle portion, between the first belt first end and the first belt second end, coupled to the canopy strut; and a second belt having:

a second belt first end coupled to the crossbar;

a second belt second end, opposite the second belt first end, coupled to the crossbar; and a second belt middle portion, between the second belt first end and the second belt second end, coupled to the canopy strut.

15. The vehicle of claim 14, wherein the seat belt assembly includes:

a first buckle coupled to the rail and extending through a first gap defined between the vehicle body and the first seat assembly; and a second buckle coupled to the crossbar and extending through a second gap defined between the seat body and the seat back.

16. The vehicle of claim 14, where the seat belt assembly includes:

a first belt loop coupled to the canopy strut, the first belt loop coupling the first belt to the canopy strut; and a second belt loop coupled to the canopy strut, the second belt loop coupling the second belt to the canopy strut.

17. The vehicle of claim 14, wherein the crossbar includes a first belt mount positioned proximate a first lateral end of the crossbar and a second belt mount positioned proximate the first lateral end, outward from the first belt mount; and wherein the first belt first end is coupled to the crossbar at the first belt mount and the second belt first end is coupled to the crossbar at the second belt mount.

18. The vehicle of claim 14, wherein the rail is positioned vertically below the crossbar.

19. A seat belt assembly for a vehicle, the seat belt assembly comprising:

a rail having a rail first end and a rail second end, opposite the rail first end;

a crossbar configured to be spaced from the rail, the crossbar having a crossbar first lateral end and a crossbar second lateral end, opposite the crossbar first lateral end;

a first buckle configured to couple to the rail between the rail first end and the rail second end;

a second buckle configured to couple to the crossbar between the crossbar first lateral end and the crossbar second lateral end;

a first belt having a first belt first end configured to couple to the crossbar and a first belt second end configured to couple to the rail, the first belt configured to be removably coupled to the first buckle; and a second belt having a second belt first end configured to couple to the crossbar and a second belt second end configured to couple to the crossbar, the second belt configured to be removably coupled to the second buckle.

20. The seat belt assembly of claim 19, wherein:

the first belt first end is coupled to the crossbar proximate the crossbar first lateral end;

the first belt second end is coupled to the rail proximate the rail first end;

the second belt first end is coupled to the crossbar proximate the crossbar first lateral end; and the second belt second end is coupled to the crossbar proximate the crossbar first lateral end.

* * * * *